(12) United States Patent
Lipton et al.

(10) Patent No.: US 7,760,429 B2
(45) Date of Patent: Jul. 20, 2010

(54) MULTIPLE MODE DISPLAY DEVICE

(75) Inventors: Lenny Lipton, Los Angeles, CA (US);
Josh Greer, Beverly Hills, CA (US)

(73) Assignee: RealD Inc., Beverly Hills, CA (US)

( * ) Notice: Subject to any disclaimer, the term of this patent is extended or adjusted under 35 U.S.C. 154(b) by 666 days.

(21) Appl. No.: 11/341,801

(22) Filed: Jan. 27, 2006

(65) Prior Publication Data

US 2007/0177007 A1    Aug. 2, 2007

(51) Int. Cl.
*G02B 27/22* (2006.01)
*G02B 27/26* (2006.01)
(52) U.S. Cl. .................. 359/462; 359/463; 359/465; 349/15; 348/57; 348/58; 348/59
(58) Field of Classification Search ............ None
See application file for complete search history.

(56) References Cited

U.S. PATENT DOCUMENTS

| | | | |
|---|---|---|---|
| 1,128,979 A | 2/1915 | Hess | |
| 2,218,875 A | 10/1940 | Parsell | |
| 2,301,254 A | 11/1942 | Carnahan | |
| 3,409,351 A | 11/1968 | Winnek | |
| 3,858,001 A * | 12/1974 | Bonne | 348/57 |
| 4,281,341 A | 7/1981 | Byatt | |
| 4,294,516 A | 10/1981 | Brooks | |
| 4,792,850 A | 12/1988 | Lipton et al. | |
| 4,967,268 A | 10/1990 | Lipton et al. | |
| 6,055,013 A * | 4/2000 | Woodgate et al. | 348/59 |
| 6,449,090 B1 * | 9/2002 | Omar et al. | 359/465 |
| 6,477,267 B1 | 11/2002 | Richards | |
| 6,985,296 B2 * | 1/2006 | Lipton et al. | 359/619 |
| 2005/0030301 A1 * | 2/2005 | Harrold et al. | 345/204 |
| 2006/0284974 A1 * | 12/2006 | Lipton et al. | 348/59 |

\* cited by examiner

*Primary Examiner*—Lee Fineman
(74) *Attorney, Agent, or Firm*—Baker & McKenzie LLP

(57) ABSTRACT

An apparatus including a selection device and a multiple mode display device is disclosed. The multiple mode display device has a lens sheet including a plurality of individual lenticules forming a lenticular surface, an electro-optical modulator positioned adjacent the lens sheet, and a display device comprising a display surface. Alternatively, a multiple mode display arrangement is disclosed, having a lens sheet including a plurality of individual lenticules forming a lenticular surface and a display device comprising a display surface. The display device is positioned behind the lens sheet, thereby enabling viewing images transmitted in at least a planar mode and a stereoscopic mode.

18 Claims, 8 Drawing Sheets

MULTIPLE MODE DISPLAY DEVICE

BACKGROUND OF THE INVENTION

1. Field of the Invention

The present invention relates in general to receiving, processing, and rendering two-dimensional and three-dimensional images, and more specifically a novel television set that operates in multiple image presentation modes able to render planar, stereoscopic, and/or autostereoscopic images.

2. Description of the Related Art

Current television sets serve a wide variety of purposes and display images with different formats. Many of today's television sets are able to display National Television System Committee (NTSC) images, high-definition television (HDTV) images, and digital images originating from a computer, digital camera, or other image capture devices. To properly display each of these image types, television sets may support a wide range of image resolutions and different aspect ratios. Often only a portion of the television display screen contains a viewable image since the very shape of the image changes depending on the content image resolution and aspect ratio. Thus, users of today's modern television sets have become accustomed to a variable viewing experience in which different types of content are presented on the display screen.

In addition, the user of a typical modern television set may obtain input images from more than one signal source. Television signals sources include signal transmission over-the-air, by physical cable such as broadband cable, by gaming consoles, and by prerecorded devices such as DVD players and cameras. Television sets supporting these signal sources provide a great deal of variety in the viewing experience, and indeed, this is part of the enjoyment of a modern television or video viewing experience.

Published concepts for stereoscopic television receivers support only one stereoscopic mode, either using an autostereoscopic display wherein wearing a form of selection device is not required for each observer, or using a plano-stereoscopic display (a two view stereoscopic image) in which all observers must wear a selection device, usually glasses, for proper image viewing.

Problems exist in single stereoscopic mode television designs that can result in a limited viewing experience, since stereoscopic content may be optimized for one kind of selection technique. Certain stereoscopic content conforms to a specification that generates images best viewed when a user wears selection device glasses, such as polarizing analyzing eyewear, and other content conforms to specifications that produce images best viewed autostereoscopically. For example, plano-stereoscopic images can have a larger parallax budget than autostereoscopic images. Autostereoscopic images often cannot make images appear to be very far off the screen without loosing sharpness whereas plano-stereoscopic images can. Therefore for content that depends on substantial off-screen effects, a plano-stereoscopic image may be superior. Moreover, some content may, for aesthetic reasons, be better viewed either with glasses or without glasses. For example, audience members/observers may watch a two-dimensional show on a single mode planar image television set supporting the NTSC standard. A content provider or advertiser typically creates three-dimensional stereoscopic content with the intent to engage and motivate the viewing audience into watching his commercial. Under typical circumstances, observers of a single mode planar image television do not require selection devices to properly view the show. When the commercial is presented, viewers will not benefit from the received three-dimensional stereoscopic content rendered, since the television set supports only a single mode, in this example a two-dimensional planar image. In this situation the advertiser's goal of engaging and retaining the viewing audience is not realized.

In another example, audience members may view a two-dimensional show on a single mode planar image television set supporting the HDTV protocol. A content provider or advertiser again creates three-dimensional autostereoscopic content with the intent to engage and motivate the viewing audience into watching his commercial. Observers of the single mode HDTV television do not require selection devices to properly view the two-dimensional show. When the commercial is presented, observers will not benefit from the received autostereoscopic content, since the television set supports only a single planar image mode, in this example a three-dimensional autostereoscopic image. Again, the advertiser's goal of engaging and retaining the viewing audience is not realized.

In both cases, the advertiser would be better served if the television set or display device could automatically present stereoscopic images to the viewer. In this case autostereoscopic images would be preferred because the viewer would not need to be actively reminded to don stereoscopic eyewear.

Required selection devices (such as selection device eyewear, e.g. glasses) for proper stereoscopic can be cumbersome from a viewer point of view. In the home environment, viewers wearing appropriate eyewear can impede or completely prevent people from performing normal daily tasks. Repeatedly having to put the glasses on and then having to take them off can create a vexing experience for many observers, especially when one considers how easily devices of this kind are lost. Consider television remote controls, whose disappearance is frequently the source of irritation in many households. While three-dimensional passive and active eyewear can provide an excellent stereoscopic viewing experience, their awkward use may not find acceptance with the viewing public. Currently, there is no unanimity amongst those in the television retail field with regard to the issue of whether or not viewers will accept wearing selection device eyewear.

Autostereoscopic images provide a novel viewing experience. However, autostereoscopic images can fail to reveal the depth and/or sharpness as when the same images are presented plano-stereoscopically and watched by observers wearing selection device eyewear. Autostereoscopic displays have traditionally been limited and do not provide the depth exhibited by plano-stereoscopic displays. Image selection for autostereoscopic displays occurs at the plane of the display screen, rather than at the eyes of the viewer as is the case for plano-stereoscopic displays. Moreover, one issue with autostereoscopic displays is the need for a multiplicity of images to be rendered to deliver images across a large viewing zone. A large viewing zone is beneficial because viewers cannot always be expected to carefully position themselves directly in front of the television set.

In addition, autostereoscopic presentation requires the display designer to carefully choose the disposition of pixels. The designer may choose to designate the pixels in a manner that allows increased resolution of individual image views, or to deploy the pixels in a different manner that affords an increase in the number of image views. Some compromise must be incorporated into the design of autostereoscopic television sets with regard to the number of perspective image views supported and to the optics that operate in conjunction with the display screen to provide an adequate angle of view. In such a design, designers must be aware that as the angle of view increases, the stereoscopic beneficial effect decreases. Thus autostereoscopic displays that provide a wide viewing angle are problematic in that the effective bandwidth requirements are much greater than for a plano-stereoscopic display.

Since plano-stereoscopic displays have certain strengths an weaknesses, i.e., great depth and sharpness but requiring the use of eyewear, and autostereoscopic displays similarly have certain strengths and weaknesses, i.e., no requirement for eyewear but comparatively limited sharpness and depth, it is advantageous to offer an architecture and design that can render multiple display modes for the accurate presentation of two-dimensional (planar) and three-dimensional images (plano-stereoscopic and autostereoscopic) that overcomes certain television set display issues present in previous designs.

SUMMARY OF THE INVENTION

According to one aspect of the present design, there is provided an apparatus comprising a selection device and a multiple mode display device. The multiple mode display device comprises a lens sheet comprising a plurality of individual lenticules forming a lenticular surface, an electro-optical modulator positioned adjacent the lens sheet, and a display device comprising a display surface.

According to a second aspect of the present design, there is provided a multiple mode display arrangement comprising a lens sheet comprising a plurality of individual lenticules forming a lenticular surface and a display device comprising a display surface. The display device is positioned behind the lens sheet, thereby enabling viewing images transmitted in at least a planar mode and a stereoscopic mode.

These and other aspects of the present invention will become apparent to those skilled in the art from the following detailed description of the invention and the accompanying drawings.

BRIEF DESCRIPTION OF THE DRAWINGS

The present invention is illustrated by way of example, and not by way of limitation, in the figures of the accompanying drawings in which.

DETAILED DESCRIPTION OF THE INVENTION

Figure 1A:
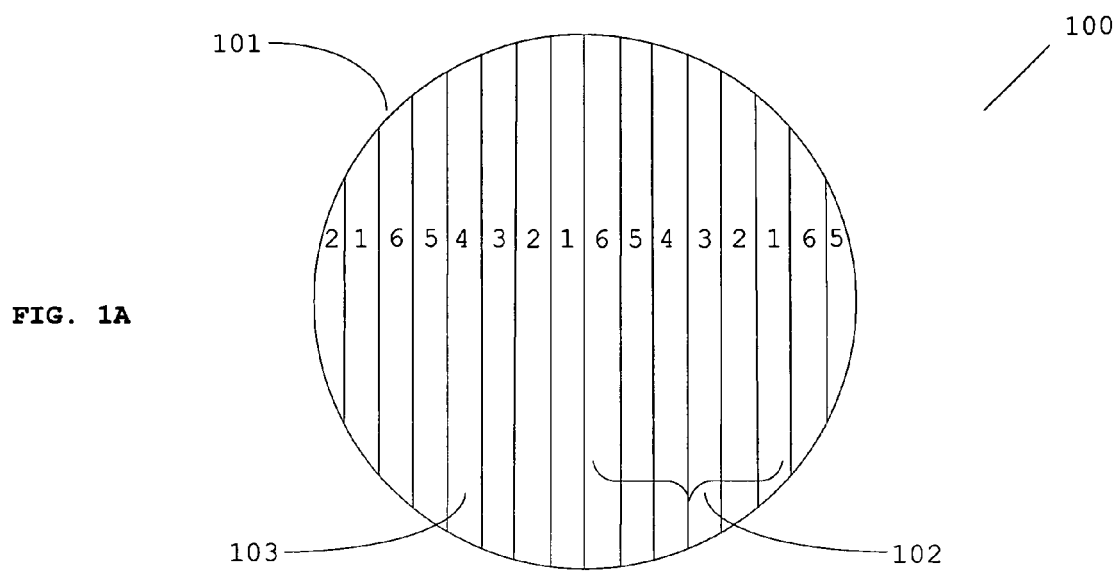
FIG. 1A illustrates a close-up view of the structure of a panoramagram image.

Reference will now be made in detail to the preferred designs of the invention, examples of which are illustrated in the accompanying drawings and tables. While the invention will be described in conjunction with the preferred designs, it will be understood that they are not intended to limit the invention to those designs. On the contrary, the invention is intended to cover alternatives, modifications, and equivalents, which may be included within the spirit and scope of the invention as defined by the appended claims.

The present design provides a system and method for a multi-mode stereoscopic television set display device able to receive, process and render planar, plano-stereoscopic, and autostereoscopic images. The present design is described using an exemplary flat panel display device employing liquid crystal or plasma screen technologies. Use of the term "television set display device", "flat panel display device", or "display device" is in no way intended to limit the application of the present design from use with a much broader class of devices which may be mobile or fixed, and which may be the form of a television set device but may also be of any number of other form factors or varieties of devices such as hand-held devices. As such, the term "display device" as used herein means the broadest description possible of a class of image rendering devices and which the image rendering techniques detailed herein may be applied, which includes, without limitation, rear-projected micro-mirror display, an optical light-emitting-diode display and other flat panel image viewing devices.

A flat panel display is fundamental to realizing a properly functioning autostereoscopic display as the flatness of the panel is of key importance with regard to optical selection device compatibility. Moreover, the pixels and sub-pixels must be registered with virtually unequivocal accuracy in the Cartesian grid arrangement exhibited in such displays. Thus, the flatness of the panel and the precise addressing of the pixels are two main elements that influence the correct presentation of an image or images on autostereoscopic displays.

Other types of display devices requiring individual selection devices (e.g. wearing glasses) can produce an excellent stereoscopic or more accurately plano-stereoscopic image. With regard to a field-sequential stereoscopic display, the refresh rate or speed of such display panels is key. Current liquid crystal panel display devices do not typically support refreshing the image at a rate sufficient to produce quality field-sequential stereoscopic displays. However, manufacturers are now producing new panel implementations that meet field-sequential specifications. Field-sequential stereoscopic displays receive left eye and right eye image data encoded on an alternate field of the video signal. Typically, the left eye and right eye images are captured from slightly different perspectives, such that when viewed with the proper selection device the image appears three-dimensional.

Furthermore, manufacturing technology is available to support the line-sequential modality, wherein alternate lines are polarized with different polarization characteristics. The line-sequential modality provides another method for creating a plano-stereoscopic display. Line-sequential stereoscopic display depend on a material that can have alternate states of polarization or retardation juxtaposed with scanned image lines or left and right pixels. The present design may incorporate these underlying stereoscopic display technologies as the basis for the multiple mode display arrangement.

Additionally, the high-definition television (HDTV) open protocol provides sufficient flexibility to produce a multiple mode television set system or display arrangement. The present design relies on the inherent flexibility of the underlying standard, or multiplicity of standards, to realize a television set device capable of rendering images in either a planar, stereoscopic, and autostereoscopic mode.

An exemplary lenticular autostereoscopic display is shown in FIG. 1A in accordance with an illustrative embodiment of the present invention. FIG. 1A illustrates a close-up detailed view of the structure of a classic panoramagram image arrangement presented on an autostereoscopic display 101. Autostereoscopic display 101 comprises a plurality of columns 102, wherein each column is further divided into individual stripes 103. For illustrative purposes and simplicity, each column comprises six stripes numbered 1 through 6. The present design may employ a smaller or larger number of stripes 103 per column 102. Multiple perspective views may be sliced into vertical stripes 103. These stripes may be arranged into a repetitive cycle of columns 102. The system and method for presentation of a panoramagram image on an autostereoscopic display are generally understood by those skilled in the art.

FIG. 1A shows a classic panoramagram arrangement 100. Tipped lens sheets may also be used in order to prevent optical moire (caused by horizontal magnification of pixel elements and their interstices) and pattern noise and to equalize the resolution in the vertical and horizontal directions in flat panel displays according to the teachings of Winnek, as reflected in, for example, U.S. Pat. No. 3,409,351.

Figure 1B:
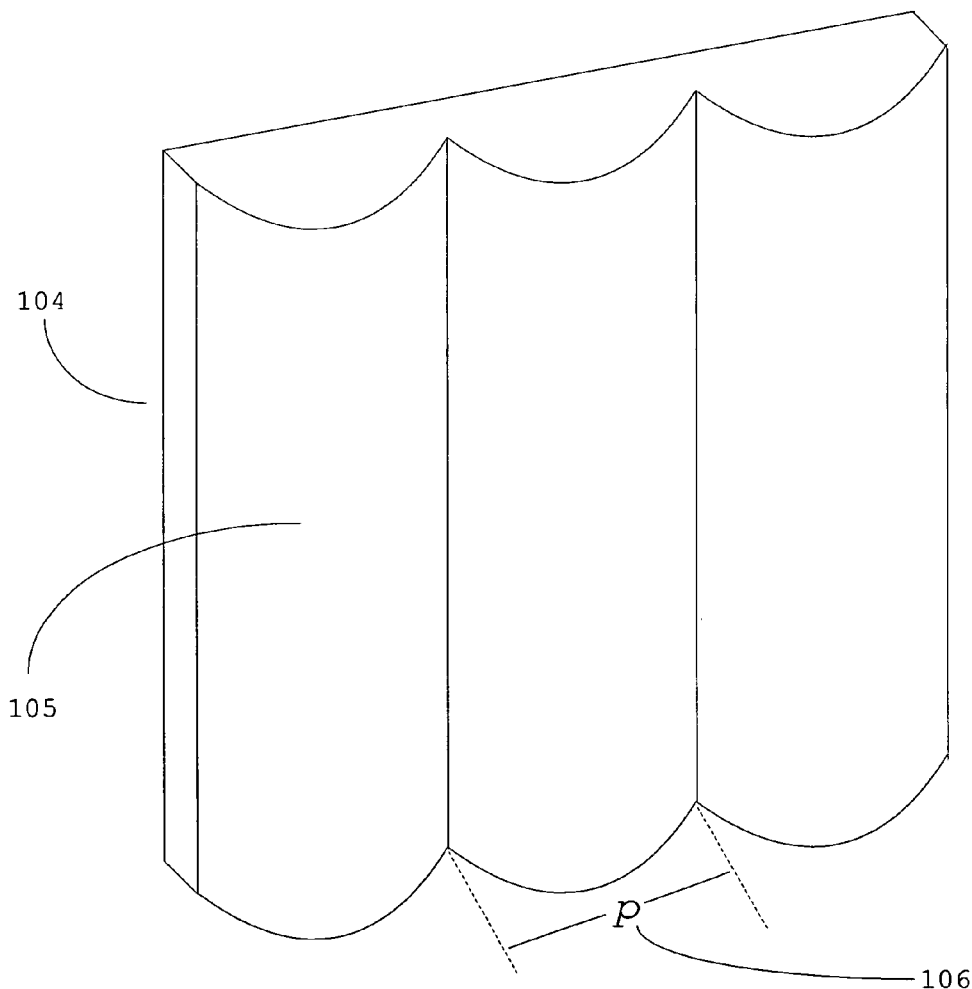
FIG. 1B illustrates a close-up view of a portion of a lenticular screen.

FIG. 1B shows a physical representation of a portion of a lens sheet corresponding to and overlaying the column and stripe structure shown in FIG. 1A. Lens sheet 104 may comprise a plurality of individual lenticules 105, wherein the pitch p 106 corresponds to the width of a column 102. The lens sheet construction may comprise a transparent refractive material, including but not limited to a glass or a plastic material. An observer viewing an image through the transparent refractive material may enable each eye of an observer to see different stripes within the columns. Since each eye observes its own view, due to the refractive properties of the lens sheet, the observer will see a stereoscopic image as each eye observes and integrates displayed stripes of images into perspective views, whereby the sum of both eyes forms what is termed a "cyclopean view" of the two perspective views.

Figure 2:
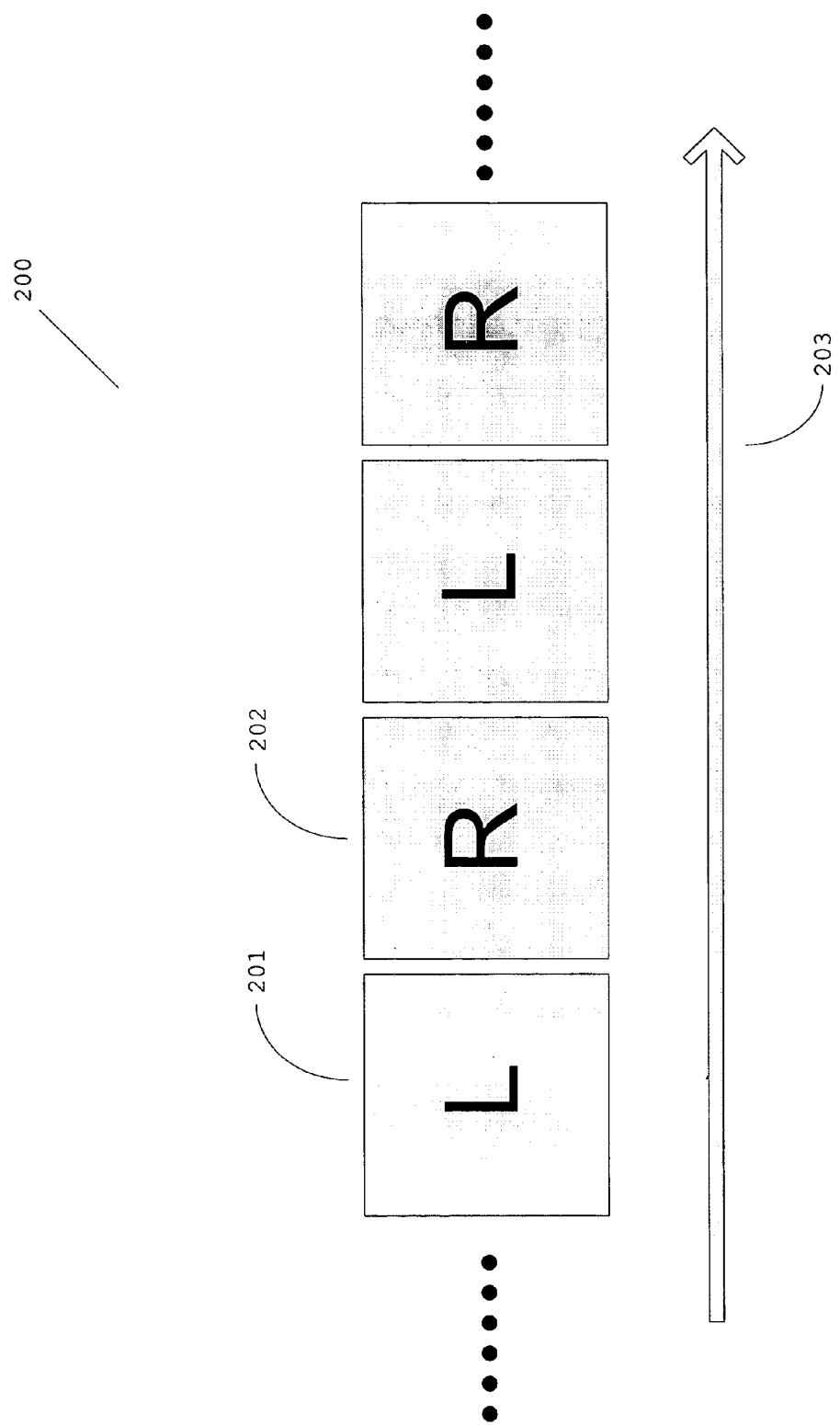
FIG. 2 is a diagrammatic view of a field-sequential plano-stereoscopic format.

FIG. 2 is presented to aid in the understanding of a time-multiplexed or field-sequential system 200. In the art of computer graphics this mode is also referred to as "page-flipping" mode. FIG. 2 shows a left picture field 201, a right picture field 202, and a time axis 203. The time-sequential mode may present a sequence of images of alternate perspectives. The display device is refreshed alternately with left and right image fields. In operation, the left image substantially disappears before the right image is written.

In conjunction with this time-multiplexed "page-flipping" mode, two general classes of viewing devices may be constructed. One viewing device may be of a form similar to that found in CrystalEyes® eyewear, available from StereoGraphics Corporation, a RealD company. CrystalEyes® eyewear provides a left and right eye electro-optical shutter synchronized to the video field rate. When a left-eye image is presented, the left shutter is open and the right is closed, and vice versa. A stream of images, if presented at a high enough repetition rate such as is shown in FIG. 2, generally appears flicker-free with a stereoscopic effect.

As an alternative, an electro-optical modulator may be placed in the optical path in juxtaposition with the display surface. The modulator switches the characteristic of polarized light at the video field rate. The observer wears polarizer analyzing spectacles, with one sheet polarizer having one characteristic and the other having another characteristic. In this arrangement the right eye passes through the right images and blocks the left images, and vice versa. In effect, the viewer is still looking through a shutter, but the parts of the electro-optical shutter are distributed between the modulator and the selection device. Typically electro-optical shutters use a sandwich of a sheet polarizer, a liquid crystal modulator, and a sheet polarizer. When these components are sandwiched together they form shutters as in the case of the CrystalEyes® eyewear.

Figure 3:
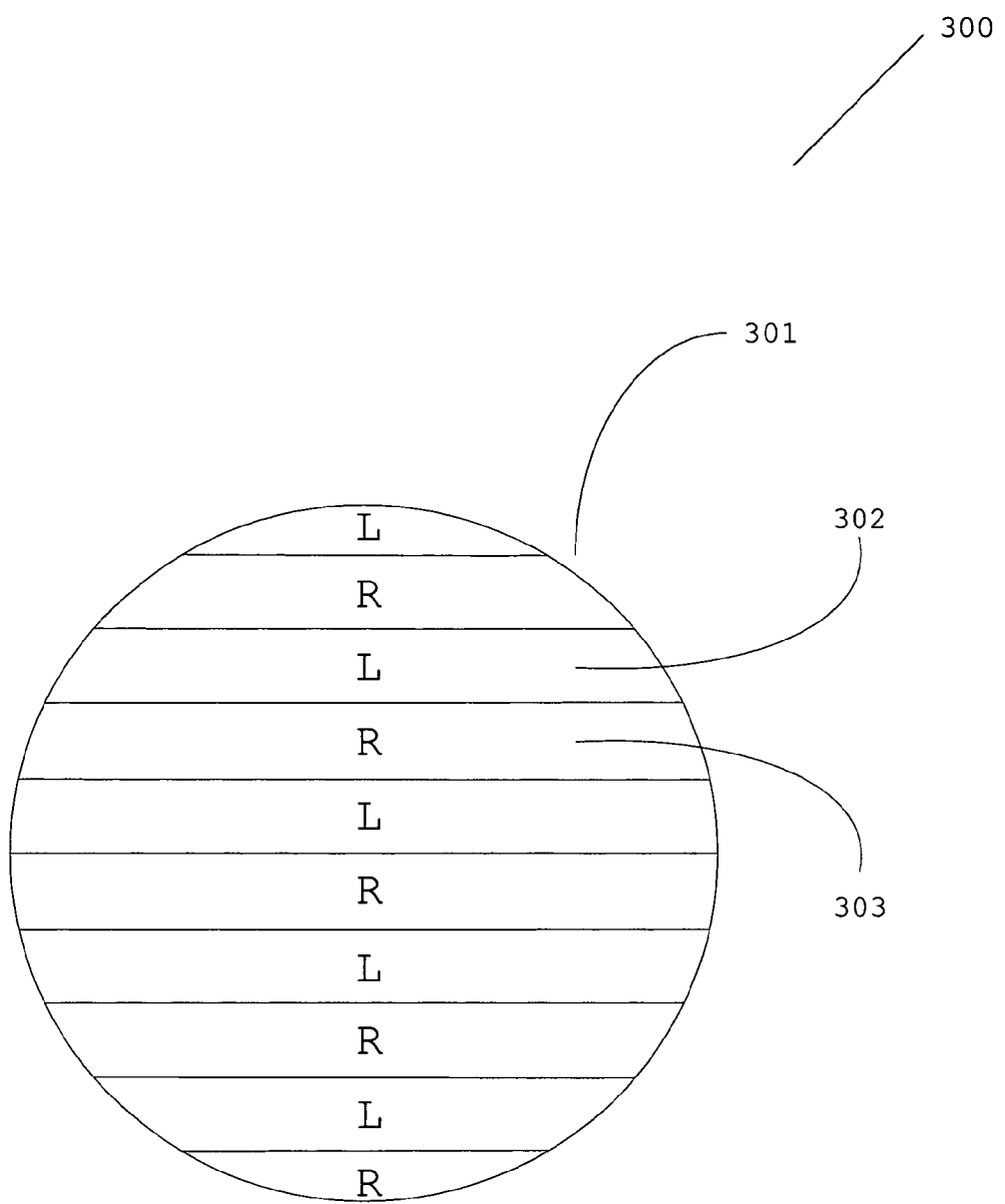
FIG. 3 illustrates a close-up view of a line-sequential stereoscopic format using line-alternate polarization states.

FIG. 3 illustrates a close-up section 300 of a display surface 301 that features alternating left and right lines of image information in the line-sequential mode as shown at 302 and 303 respectively. Television is a process that involves an engraving-like raster, and in the technique that is described here (the trade name Micropol, for microscopic polarizer, has been used for the process), a left line is written in juxtaposition with a sheet polarization device of one characteristic, and at a slightly later time a right line is written that is in intimate juxtaposition with another portion of the Micropol, or similar material, in a different state of polarization. The aggregate effect when the observer is far enough away is a relatively seamless image in which the image structure is unobtrusive and the right eye sees the right perspective image and the left eye sees the left perspective image.

In addition to line-sequential arrangement of the material a checkerboard arrangement of alternate states of polarization has been shown, polarization strips may be oriented in the vertical direction. Any of these arrangements, line or dot sequential, may be resorted to without loss of generality. Additionally, as those skilled in the art can appreciate, a micropolarizing array can also output circularly polarized like using a stack of retarders and polarizers. In the present design, there is no imposed limitation on the type of polarization that the device may output.

Figure 4A:
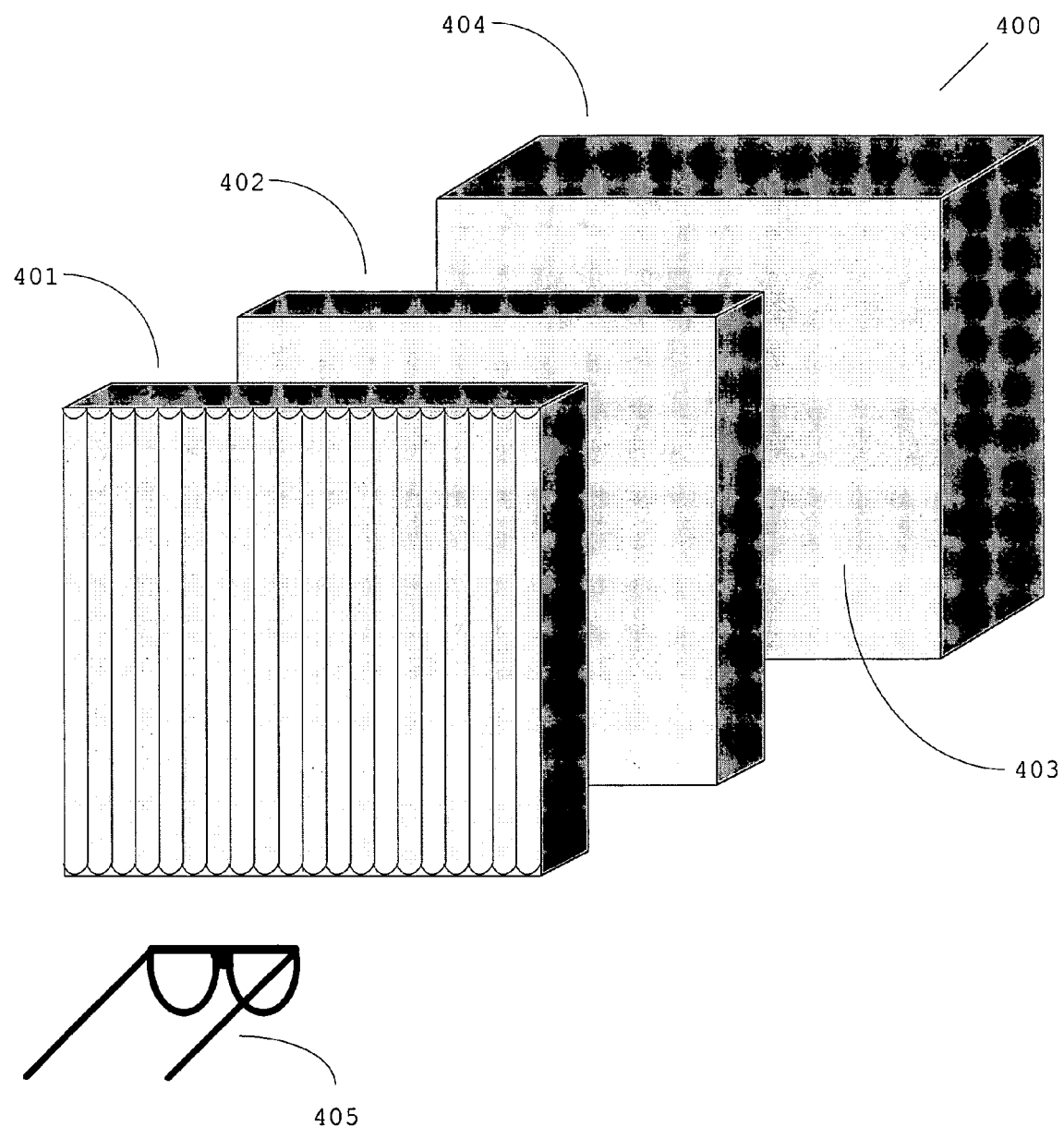
FIG. 4A illustrates a multiple mode display arrangement employing first a lenticular sheet, second an electro-optical modulator, and third an electronic display device.
Figure 4B:
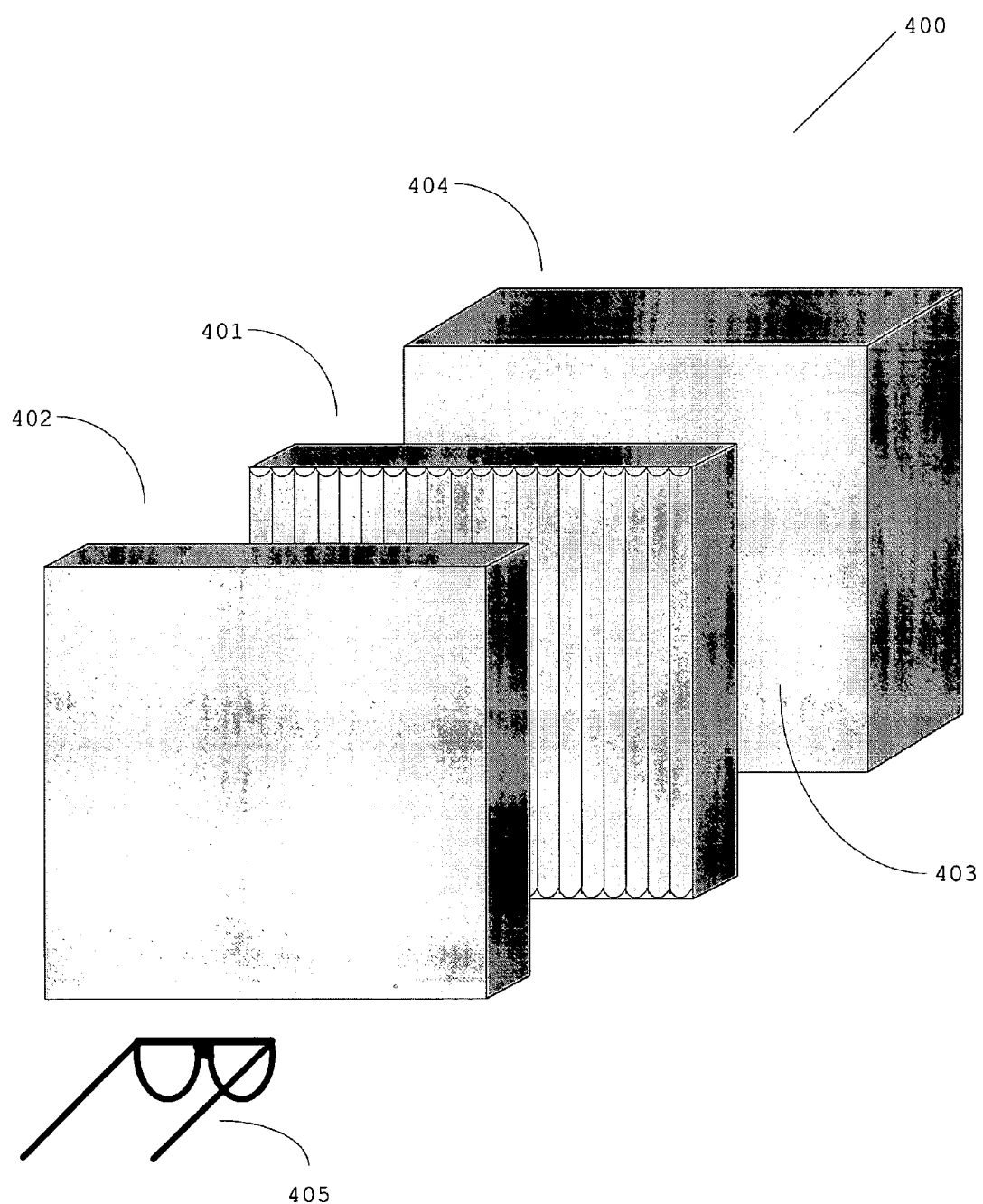
FIG. 4B illustrates a multiple mode display arrangement employing first an electro-optical modulator, second lenticular sheet, and third an electronic display device.
Figure 4C:
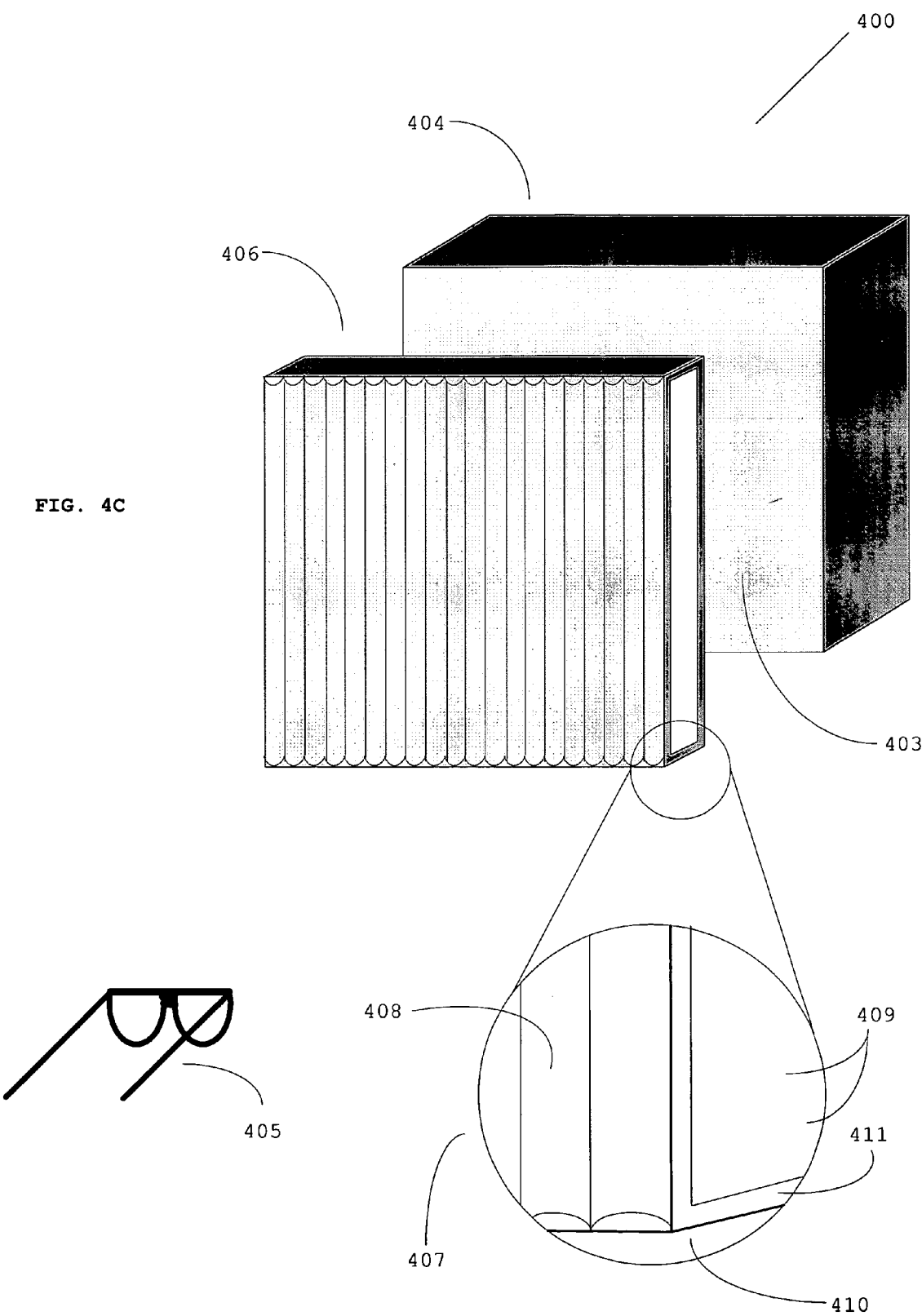
FIG. 4C illustrates a multiple mode display arrangement employing an integral lenticular sheet and electro-optical modulator in juxtaposition with an electronic display device.

Exemplary multiple mode display arrangements are shown in FIGS. 4A, 4B, and 4C in accordance with an illustrative embodiment of the present invention. FIGS. 4A, 4B, and 4C illustrate three configurations for producing a multiple or tri-mode television set using polarizing analyzing spectacles. FIG. 4A shows the components of one embodiment of the present design where a multiple or tri-mode television set or display arrangement 400 may position a lenticular sheet first, followed by an electro-optical modulator second, and positions an electronic display device third, behind the second component. In the first embodiment of the present design, the multiple mode display arrangement 404 may comprise a lens sheet 401, located in front and positioned closest to the viewer, wherein an electro-optical modulator 402 may be positioned between the lens sheet 401 and the display surface 403 of multiple mode display arrangement 404.

FIG. 4B shows the components of a second embodiment of the present design where a tri-mode television set arrangement 400 may position the electro-optical modulator first, followed by the lenticular sheet second, and positions the electronic display device third, behind the second component. In the second embodiment of the present design, the multiple mode display arrangement 404 may comprise an electro-optical modulator 402, located in front positioned closest to the viewer, wherein the lens sheet 401 may be positioned between the electro-optical modulator 402 and display surface 403 of multiple mode display arrangement 404. In these two embodiments, the lenticular surface of the lens sheet 401 is illustrated as facing outward towards the observer. However, the present design arrangement alternatively may face the lenticular surface of lens sheet 401 in an inward facing orientation.

The present design electro-optical modulator may use a pi-cell, generally known in the art and configured with multiple electrode segments animated to follow the scanning or pixel location of the display.

In the planar mode the present design electro-optical modulator 402, which may comprise a pi-cell configuration such as that described in Lipton, U.S. Pat. No. 4,792,850, may not be energized, and in the plano-stereoscopic mode the viewer may wear passive polarizing spectacles 405. The present design functions as a normal television set in each configuration illustrated in FIGS. 4A, 4B, and 4C. The present design may employ planar pass-through technology affording a sharp planar image to pass through lens sheet 401.

One method for realizing planar pass-through (presenting a good-quality planar image through a lenticular lens sheet) is implemented in the software and optical design as described in the co-pending application Ser. No. 60/669,818, "Autostereoscopic Display with Planar Pass-Through," which is hereby incorporated by reference. Various concepts are presented in the '818 application, including introducing bleed-through to improve planar viewing through a microlens array by introducing blurring to the pixel data. Blurring introduction can be performed using software. This technique includes making a particular pixel's information visible throughout all viewing zones by spreading out that pixel's information among neighboring pixels. Low pass digital filtering may be employed, as well as anti-aliasing, use of imperfect optics, and scaling of original data.

Use of the techniques of the '818 application allows plano-stereoscopic images to be presented through the lens sheet 401. The present design may combine planar pass-through technology with a field-sequential or a line-sequential technique to present a plano-stereoscopic image to the observer's eyes. A plano-stereoscopic image comprises two views, and in the field-sequential mode may refresh the same pixel that serves a dual purpose. The field-sequential mode may use each pixel once for the left perspective, and then once for the right perspective. Thus a field-sequential mode stereoscopic display can double or at least maintain the resolution. In effect, the overall resolution is doubled when considering both eyes, but for each eye it maintains or preserves the resolution.

The present design planar pass-through function may enable display of conventional two-dimensional images, and a series of planar images forming a plano-stereoscopic image. In this embodiment, the present design may set the electro-optical modulator 402 in an inactive state, thus simply functioning as a cover glass. This arrangement of the present design, when configured in the embodiments shown in FIG. 1, may allow ordinary planar or two-dimensional television images displayed on the electronic display device 403 to pass through to the electro-optical modulator 402 without influence.

In the field-sequential mode stereoscopic display, the present design may increase, or approximately double, the field rate of the display device. For example, if the display device normal field rate is 60 fields per second, then 120 fields per second (60 per eye) provide a quality image. The present design may operate at a field rate less than double, producing an acceptable image at rates possibly as low as 90 fields per second (45 per eye). The present design may alternate the train of left and right images, as shown in FIG. 2, and may pass the left and right images through the lens sheet 401. In this embodiment, the present design activates the electro-optical modulator 402, which may modify the characteristic of polarized light at video field rate. An optical device, i.e. analyzers, in the passive eyewear 405 serves to, in combination with the modulator, alternately occlude and pass through the desired images. In this arrangement, the passive eyewear 405 and the electro-optical modulator 402 form a shutter and a train of left or right images may pass to the appropriate observer's eye while blocking the inappropriate eye. In this arrangement, the display device functions at a high field rate in effectively the planar pass-through mode, and the viewer wearing passive eyewear 405 may observe a stereoscopic image.

In the autostereoscopic mode, the present design may set or return the field rate to its normal rate, being 60 fields per second. In this arrangement, the image may be appropriately interdigitated. The present design may format the image, as shown in FIG. 1A, and may refract the formatted image by a lens sheet 104 as shown in FIG. 1B. The method produces an autostereoscopic image that may be viewed without the requirement of wearing passive eyewear 405.

In general, FIGS. 4A and 4B are functionally identical and the detailed description presented in the context of one embodiment applies to the other, wherein only the location of the lens sheet 401 and electro-optical modulator 402 are interchanged.

FIG. 4C illustrates the components of tri-mode television set 400 comprising display device 404 with a display screen 403. In this embodiment, the present design may combine the lens sheet 401 with the electro-optical modulator 402 resulting in a single integral part 406. An exploded view of this combination is shown as a portion of a corner section of an integral lens sheet modulator 406 in FIG. 4C at 407. The present design may bond the lens sheet 408 to the electro-optical modulator. FIG. 4C shows the lens sheet 408 bonded to the modulator's front surface, however the present design may also suffice for rearward-facing lenticules.

The electro-optical modulator employed by the present design may comprise two plain sheets of glass, wherein a liquid crystal film is positioned between the two glass sheets. FIG. 4C shows an electro-optical modulator arrangement incorporating edge seals 410 and glass plates 409, which are parallel to each other, and having the liquid crystal material 411 filled in between the glass plates 409. In the case of the pi-cell modulator the liquid crystal material typically must have a negative dielectric anisotropy. Other types of liquid crystal modulators have been demonstrated and these may employ other materials without loss of generality. The lens sheet 408 may be laminated, adhered, or cast, onto the electro-optical modulator 402 to form an integral unit 406. The functionality of this multiple mode display arrangement is substantially identical to the embodiments presented in FIGS. 4A and 4B, including the passive eyewear 405, except in this arrangement one part (integral unit 406) is functioning as both polarizing modulator and lens sheet.

Figure 5:
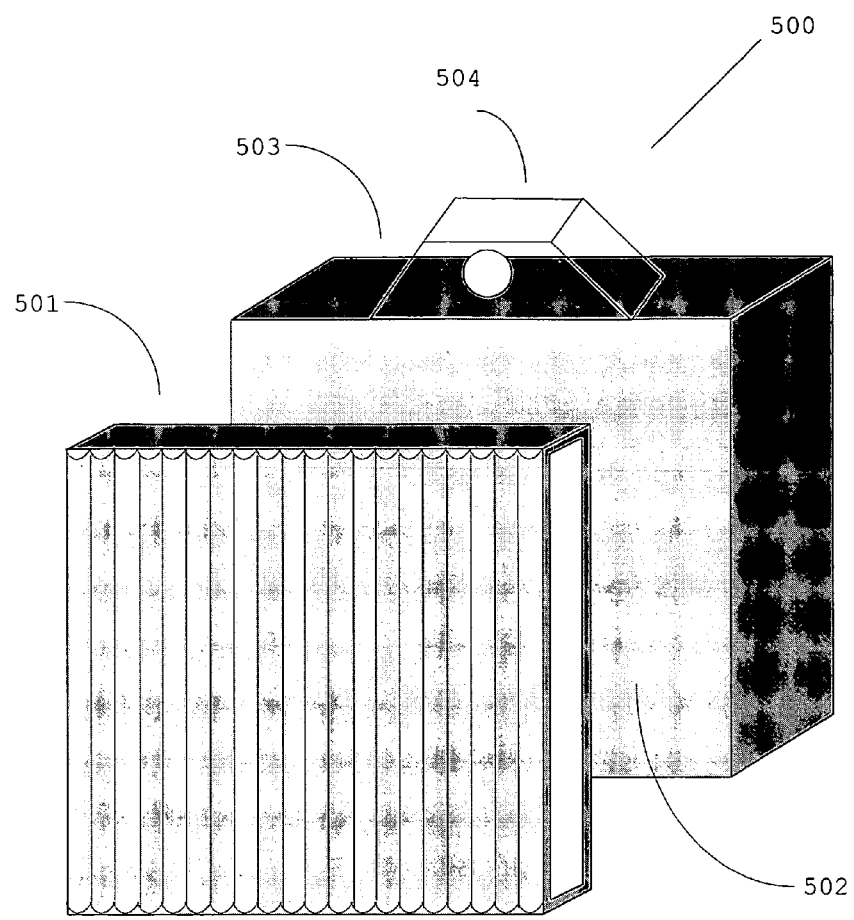
FIG. 5 illustrates a multiple mode display arrangement employing a lenticular screen in juxtaposition with an electronic display device that incorporates a communications device for active eyewear.
Figure 5:
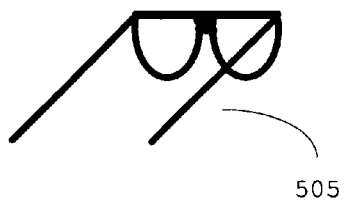

The present design television set 503 shown in FIG. 5 may operate or function in three modes: planar, and two stereoscopic modes. The autostereoscopic mode benefits from the lens sheet, and the plano-stereoscopic mode requires active shuttering eyewear 505. FIG. 5 illustrates the components 500 of a tri-mode television set 503 with a display surface 502 and may be realized using plasma display technology. Liquid crystal displays, because of the long lag associated with their scanning technique, can best be employed in conjunction with the Byatt modulator configuration in which electrode chambers scan or animate along with the scanning method of the display and thus may have limited applicability in the present design. The present design may cycle the display surface 502 by turning it on and then off to enable the field-sequential mode. The present design may broadcast a communications signal by means of a radio transmitter or an infrared emitter 504, i.e. broadcast unit, whereby active shuttering eyewear 505, e.g. CrystalEyes®, may receive the emitted signal. FIG. 5 shows the lens sheet 501 juxtaposed with the display surface 502.

The tri-mode television display device 503 may function in the planar mode. In the planar mode the present design may employ the aforementioned planar pass-through feature. In this mode, the image is not interdigitated and the image passes through lens sheet 501 enabling the observer to view a planar image, without wearing glasses. When set to the autostereoscopic mode, the present design properly interdigitates the image and in conjunction orchestrates the columns 102 and stripes 103 as previously shown in FIG. 1A. The present design may then pass this 'processed' image through the lens sheet 104 arrangement as shown in FIG. 1B, and may allow the observer to view an autostereoscopic image. When set to the plano-stereoscopic mode, the observer may employ active shuttering eyewear 505 to properly view the displayed images. The present design may operate in the planar pass-through mode to support stereoscopic viewing. In this mode the display device may operate a higher field rate, as previously described, and may double the field rate associated with planar image display. The emitter 504 broadcasts a signal, which may include but is not limited to infrared, radio, or other communications mechanism, that may be received by active shutter eyewear 505.

The communications link may operate in a manner commensurate with the teachings of Lipton, U.S. Pat. No. 4,967, 268, which is hereby incorporated by reference. Generally, the '268 patent presents A liquid crystal shutter system for selecting fields of a field-sequential image by transmitting the field-sequential image and a synchronization signal, to one or more remote liquid crystal cell shutter assemblies. Each shutter assembly transmits selected fields of the field-sequential image in response to a drive signal, and includes a drive circuit for receiving the synchronization signal and generating each drive signal in response to the synchronization signal so that each drive signal has transitions synchronized with image fields.

The drive circuit of the '268 patent is capable of rapidly processing short duration synchronization signals with very low power consumption. Two liquid crystal cell assemblies may be mounted in an eyeglass frame and used as a wireless selection device for a field-sequential stereoscopic image. A synchronization signal receiver may be provided having a narrow angular reception range so that the receiver is sensitive to only one synchronization signal at a time, to view several monitors without interference between different synchronization signals from the different monitors. The shutter assemblies are capable of operating in a non-occluding state, and each shutter assembly may conveniently be switched between a state suitable for stereoscopic viewing and a non-occluding state suitable for viewing a non-stereoscopic image.

Figure 6:
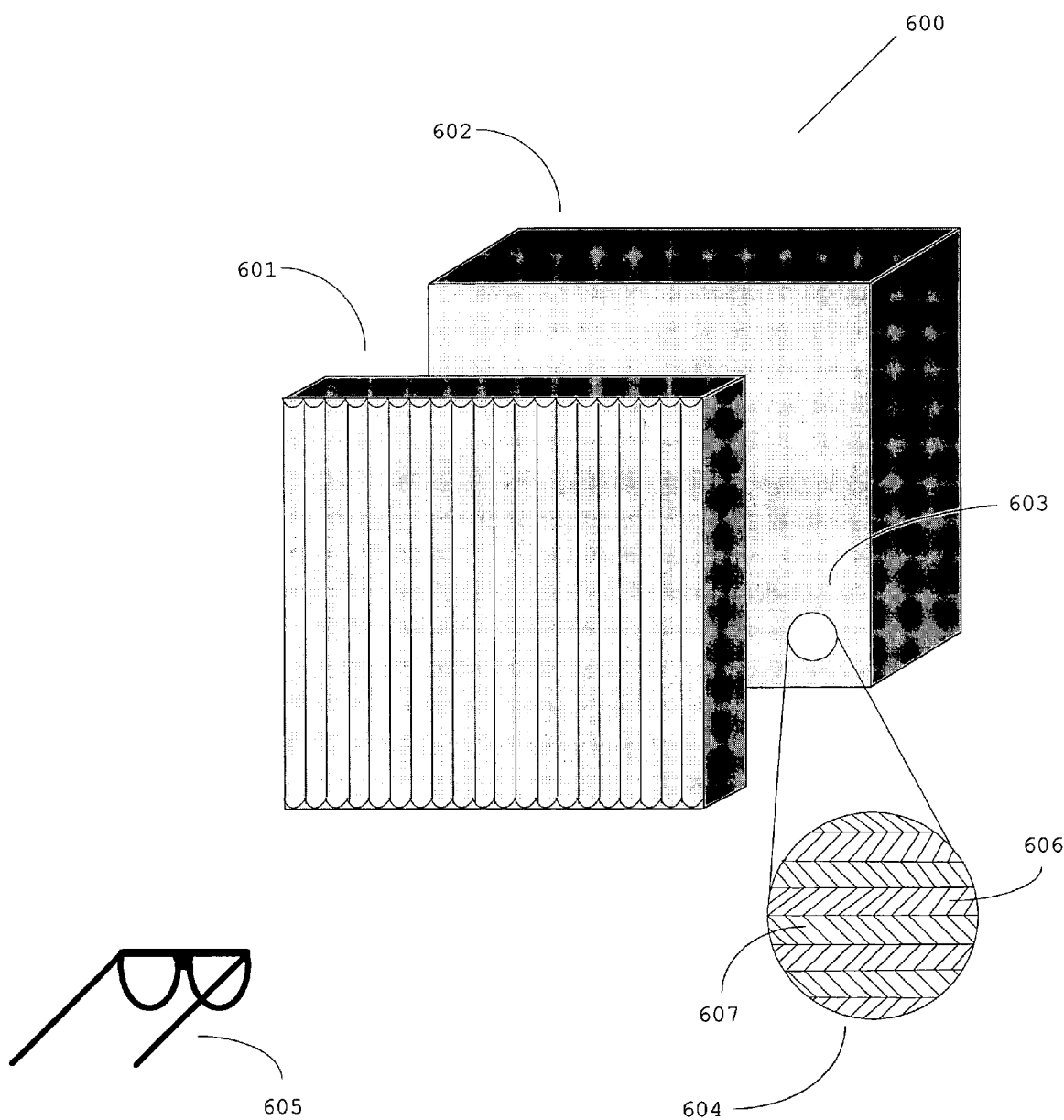
FIG. 6 illustrates a multiple mode display arrangement employing a lenticular screen in juxtaposition to an electronic display using line-sequential alternately polarized rows of image.

An alternate embodiment of the present design is illustrated in FIG. 6, where the tri-mode television set 600 may operate using alternate rows of perspective scan lines coupled with polarization strips, as previously described. Display device 602 may employ an imaging surface 603 and lens sheet 601. In this arrangement, the observer may view plano-stereoscopic images using passive eyewear 605. When operating in either the planar or the stereoscopic mode, the present design display device 602 may operate at the normal field rate. In the planar mode the observer does not wear glasses and the image simply passes through the various selection device components. In the stereoscopic mode, the present design may employ a line-sequential modality technique, wherein alternate lines may be polarized with different polarization characteristics.

FIG. 6 shows an enlarged part of the imaging surface 604 wherein polarization strips of alternate characteristics 606 and 607 cover the scan lines. The hatch marks illustrated in FIG. 6 indicate the different characteristics of polarization, and the design of FIG. 6 generally corresponds to the design of FIG. 3.

The display device in this embodiment may include retarder strips and may align the retarder strips on top of the outer polarization surface of a liquid crystal display. Such an arrangement uses alternate regions having no polarization or retardation properties so that the retardation areas toggle the axis of the polarized light through ninety degrees to provide the basis for polarization encoding to be analyzed by means of the selection device spectacles. If a plasma display is used, polarizer strips of alternate regions whose axes are orthogonal to each other (without non-polarizing and retarding regions) may be overlaid. Overlaying polarizer strips in this manner is desirable because plasma panel image forming does not require polarization. Operating in the plano-stereoscopic mode, the present design may format the image using an "interlace mode," wherein odd and even lines scanning may be employed with left and right perspective in correct juxtaposition with polarization stripes 606 and 607. In this arrangement, when the observer wears eyewear 605 and views the image, he or she will see a stereoscopic representation. In order to support the autostereoscopic mode, the present design may implement the interdigitation function and may prepare the image as previously described and shown in FIG. 1A, i.e. made up of stripes 103 and columns 102. The lenticular nature of the display device is illustrated in FIG. 1B.

Autostereoscopic images may comprise a plurality of multiple images, usually more than two, in order to provide a sufficiently acceptable angle of view. These multiple perspective views are interdigitated as described and illustrated in FIG. 1A, and these multiple perspective views may be transmitted to the television set receiver using any one of a variety of methods. One transmission method suitable for autostereoscopic presentation is the multi-tile format method that is described in the pending "Autostereoscopic Pixel Arrangement Techniques," U.S. patent application Ser. No. 09/876, 630, which is hereby incorporated by reference. In general, the '630 application discloses and claims scale reduction and pixel mapping in the context of preparing multi-view data for autostereoscopic display. The '630 autostereoscopic display system generates and displays an interdigitated stereogram on an electronic display. The display includes a lenticular screen over the surface of the display which allows the user to observe the stereogram on the display and obtain a true stereoscopic effect. The resolution of master images is minimized and pixels from the master images are mapped to form the interdigitated stereogram. The optimum minimization of the resolution is obtained when the ratio of horizontal resolution to vertical resolution for the master images approximates the screen aspect ratio of the display. In this way, less computation is involved in remapping the pixels to form an interdigitated stereogram.

Another suitable transmission method for autostereoscopic presentation is the depth map technique, as taught by Richards, U.S. Pat. No. 6,477,267, which is hereby incorporated by reference.

The present design described herein may receive any one of several different types of signals. These signals are then interdigitated and written on the pixel structure of the display device; and the resulting map is viewed through the lens sheet 601, which refracts the image to the appropriate eye rendering an autostereoscopic image for viewing by an observer.

In the case of the planar image, there is no interdigitation function, and the image simply passes through the lens sheet 601. In the case of a field-sequential stereoscopic image, the present design may increase the field rate of the display device and the observer may wear either passive or active glasses, as previously described. In the case of passive glasses, an electro-optical modulator 402 (not shown) must be used in conjunction with the display device. In the case of active glasses, the present design may communicate instructions, via a communication link (not shown), between the display device and active shutter eyewear 505 regulating when to open and close the shutters in synchrony with the video field rate. And finally, in the embodiment comprising a Micro-Pole technique, the planar and plano-stereoscopic modes are identical, and planar pass-through aids both modes for presenting an appropriate stereoscopic image or a planar image to the observer's eyes.

By the foregoing description, an improved multiple mode television system has been described. The foregoing description of specific embodiments reveals the general nature of the disclosure sufficiently that others can, by applying current knowledge, readily modify and/or adapt the system and method for various applications without departing from the general concept. Therefore, such adaptations and modifications are within the meaning and range of equivalents of the disclosed embodiments. The phraseology or terminology employed herein is for the purpose of description and not of limitation.

What is claimed is:

1. An apparatus, comprising:
    a selection device; and
    a multiple mode display device, comprising:
        a lens sheet comprising a plurality of individual lenticules forming a lenticular surface;
        an electro-optical modulator positioned adjacent the lens sheet; and
        a display device comprising a display surface; and
    wherein the multiple mode display device operates in a planar image mode configured to present two-dimensional images to a viewer, and a plano-stereoscopic mode and an autostereoscopic mode for presenting three-dimensional images to the viewer; and
    wherein the lens sheet is disposed on an output side of the display device.

2. The apparatus of claim 1, wherein the selection device comprises passive eyewear.

3. The apparatus of claim 2, wherein the passive eyewear comprises polarizing analyzing spectacles.

4. The apparatus of claim 1, wherein the lenticular surface of the lens sheet is facing outward away from the display surface.

5. The apparatus of claim 1, wherein the lenticular surface of the lens sheet is facing inward towards the display surface.

6. The apparatus of claim 1, wherein the electro-optical modulator is a pi-cell configured to follow the scanning or pixel location of the display device.

7. The apparatus of claim 1, wherein the lens sheet may be bonded to forward facing lenticules of the electro-optical modulator, thereby forming an integral unit.

8. The apparatus of claim 1, wherein the lens sheet is bonded to the electro-optical modulator's rearward facing lenticules, thereby forming an integral unit.

9. The apparatus of claim 1, wherein the display surface is cycled on and off, thereby operating in a field-sequential stereoscopic mode.

10. The apparatus of claim 1, wherein the display device operates in a planar pass-through mode.

11. The apparatus of claim 1, wherein the display surface presents alternating left and right lines of image information operating in a line-sequential mode.

12. A multiple mode display arrangement, comprising:
    a lens sheet comprising a plurality of individual lenticules forming a lenticular surface;
    an optical modulator; and
    a display device comprising a display surface to produce images directly to the optical modulator;
    wherein the display device is positioned behind the lens sheet and the optical modulator is positioned between the display device and lens sheet, thereby enabling viewing the images transmitted in at least a planar mode, a plano-stereoscopic mode, and an autostereoscopic mode to a viewer directly through the lens sheet.

13. The multiple mode display arrangement of claim 12, further comprising a selection device employable by a user to view images transmitted in a plano-stereoscopic mode.

14. The multiple mode display arrangement of claim 12, wherein the display surface comprises:
    a plurality of polarization strips configured such that scan lines of the display surface are coupled with the polarization strips.

15. The multiple mode display arrangement of claim 14, wherein the polarization strips comprise alternating characteristics covering the scan lines.

16. The multiple mode display arrangement of claim 15, wherein the display arrangement is configured to operate in an interlaced mode, wherein odd and even scanning lines representing left and right perspectives in correct juxtaposition with the polarization strips render a piano-stereoscopic image.

17. The multiple mode display arrangement of claim 12, wherein the display device comprises a liquid crystal display and a plurality of retarder strips are aligned on the top of an outer polarization surface of the liquid crystal display.

18. The multiple mode display arrangement of claim 12, wherein the display device comprises a plasma display and wherein a plurality of polarizer strips overlay the plasma display.

* * * * *